(12) United States Patent
Knight et al.

(10) Patent No.: US 12,737,561 B2
(45) Date of Patent: Sep. 15, 2026

(54) TEXT-BASED REPRESENTATIONS OF LOCATION DATA FOR LARGE LANGUAGE MODEL-BASED ITEM IDENTIFICATION

(71) Applicant: Maplebear Inc., San Francisco, CA (US)

(72) Inventors: Benjamin Knight, Oakland, CA (US); Kenneth Jason Sanchez, Orange, CA (US); Matthew Negrin, Brooklyn, NY (US); Licheng Yin, Burlingame, CA (US); Christopher Billman, Chicago, IL (US); Rebecca Riso, Croton-On-Hudson, NY (US)

(73) Assignee: Maplebear Inc., San Francisco, CA (US)

( * ) Notice: Subject to any disclaimer, the term of this patent is extended or adjusted under 35 U.S.C. 154(b) by 58 days.

(21) Appl. No.: 18/912,395

(22) Filed: Oct. 10, 2024

(65) Prior Publication Data

US 2025/0124238 A1 Apr. 17, 2025

Related U.S. Application Data

(60) Provisional application No. 63/589,797, filed on Oct. 12, 2023.

(51) Int. Cl.
*G06F 40/40* (2020.01)
*G06F 40/205* (2020.01)

(52) U.S. Cl.
CPC ............ *G06F 40/40* (2020.01); *G06F 40/205* (2020.01)

(58) Field of Classification Search
CPC ............... G06F 16/243; G06F 16/3329; G06F 16/90332; G06F 3/167; G06F 40/20;
(Continued)

(56) References Cited

U.S. PATENT DOCUMENTS 11,886,826 B1 * 1/2024 Bavarian ............... G06F 40/253
12,299,015 B2 * 5/2025 Krishnan ............. G06F 16/243
(Continued)

OTHER PUBLICATIONS

Jiang, Yue, et al. "ILuvUI: Instruction-tuned Language-Vision modeling of UIs from Machine Conversations." arXiv preprint, arXiv:2310.04869, Oct. 7, 2023, https://arxiv.org/abs/2310.04869 (Year: 2023).*
(Continued)

*Primary Examiner* — Edgar X Guerra-Erazo
(74) *Attorney, Agent, or Firm* — Fenwick & West LLP

(57) ABSTRACT

An online system generates text-based representations of various types of data for processing using a large language model. The online system extracts location data from a map of a source location and converts the location data into a text-based representation of the location data. The online system receives a set of item identifiers from a client device of a user and generates an LLM prompt based on the set of item identifiers and the text-based representations of the location data. The online system receives a response from the LLM and parses the response for a text-based description of related items. The online system maps the text-based description of the related items to item identifiers and transmits a notification to the client device that includes item data associated with the related items.

20 Claims, 5 Drawing Sheets

(58) Field of Classification Search
CPC .......... G06F 40/00; G06F 40/35; G06F 40/30; G06F 16/334; G06N 3/0455; G06N 3/045; G06N 3/0464; G06N 3/0475; G06N 3/094; G06N 3/092; G06N 3/088
See application file for complete search history.

(56) References Cited

U.S. PATENT DOCUMENTS

| | | | | |
|---|---|---|---|---|
| 2021/0406812 | A1* | 12/2021 | Deshmukh | G06Q 10/06315 |
| 2022/0198132 | A1* | 6/2022 | Peleg | G06N 3/09 |
| 2024/0311549 | A1* | 9/2024 | Puri | G06F 40/30 |
| 2025/0005050 | A1* | 1/2025 | Krishnan | G06F 16/243 |

OTHER PUBLICATIONS

R. Yu, Y. Guan and Y. Zhan, "ShoppingGPT: A GPT-based Product Recommendation Dialogue System," 2023 IEEE 4th International Conference on Pattern Recognition and Machine Learning (PRML), Urumqi, China, 2023, pp. 501-509 (Year: 2023).*

* cited by examiner

TEXT-BASED REPRESENTATIONS OF LOCATION DATA FOR LARGE LANGUAGE MODEL-BASED ITEM IDENTIFICATION

CROSS REFERENCE TO RELATED APPLICATION

This application claims the benefit of U.S. Provisional Application No. 63/589,797, filed Oct. 12, 2023, which is incorporated by reference.

BACKGROUND

Online systems may receive various types of data to perform a proper analysis of the data. For example, an online system may identify items that are related to another set of items for clustering analyses, data augmentation, anomaly detection, or content selection. However, each type of data generally comes in a different data format. For example, location data describing a device's location may be represented as GPS coordinates or as coordinates with regards to some unknown or unhelpful origin. Similarly, item data may itself contain data in many different formats, such as strings representing text descriptions of items, integers representing features of the items, or Booleans representing whether the items are restricted from being collected for certain users.

Since conventional computing systems (such as online systems) require that data be structured in particular formats to be analyzed, significant effort goes into ensuring that the data used by these systems is appropriately structured for the system's use. However, the data that is input to the systems may change over time. For example, the reference point for location data coordinates may change or a field may be added to or removed from item data for items. This problem may be especially pervasive where an online system interacts with other third-party systems, since those systems may change the structure or format of their data without conferring with the online system. Therefore, significant resources of the online system may be used to simply ensure that data is in the correct format or structure for processing.

SUMMARY

In accordance with one or more aspects of the disclosure, an online system generates text-based representations of various types of data for processing using a large language model. The online system may use the large language model to identify items related to those identified by a user or to route users within a source location.

The online system extracts location data from a map of a source location. The location data describes the locations of items within the source location. The location data may include a location of every item of a set of items within the source location or may indicate areas that include categories of items. The online system converts the location data into text-based representations of the location data. These text-based representations describe the location data using text, rather than through the existing format that the location data may be captured in. The online system may use a template or rules-based logic to convert the location data to text-based representations. For example, the online system may use additional information in the map to identify areas within which coordinates for items are located and extract or generate text-based descriptions based on the additional information in the map.

The online system receives a set of item identifiers from a client device associated with a user. Each of the item identifiers corresponds to an item available at the source location. The online system uses the set of item identifiers to identify a set of related items. The set of related items are items that have some relationship to the items corresponding to the set of item identifiers. To identify the set of related items, the online system generates a prompt for a large language model. The prompt for the large language model is text to be input to the large language model to generate a text output from the model. The prompt includes item data describing items corresponding to the received set of item identifiers and the text-based representation of the location data. In some embodiments, the prompt includes candidate item data describing items that are available at the source location. The prompt also includes text instructions that instruct the large language model to identify the set of related items. The text instructions may include metrics for the large language model to use to identify the set of related items.

In some embodiments, the online system also receives device location data captured by a sensor of the client device describing a location of the client device within the source location. The online system may generate a text-based representation of the device location data and include this text-based representation in the prompt as well. The text instructions may further instruct the large language model to identify the set of related items based on the text-based representation of the device location data.

In some embodiments, the online system receives other types of data to be used to identify items related to those identified by the user. For example, the online system may use user data describing the user, context data describing a context in which the user transmitted the set of identifiers, or source data describing the source location to generate the prompt to the online system. The online system may generate text-based descriptions of these other types of data and include those text-based descriptions in the prompt.

The online system receives a response from the large language model and parses the response to extract a text-based description of the set of related items. For example, the prompt may include instructions instructing the large language model to generate the text-based description of the set of related items in a particular format. The online system may use this particular format to identify the text-based description in the response from the large language model.

The online system maps the text-based description of the set of related items onto identifiers for the related items. For example, the text-based description of the set of related items may describe categories or generics for items, rather than individual items available at the source location. The online system may map these categories or generics onto item identifiers for related items to generate the set of related items.

The online system transmits a notification to the client device for display to the user. The notification includes item data associated with the set of related items and the notification is displayed to the user with the item data. For example, the online system may notify the client device that an item of the set of related items is related to one or more items of the received set of item identifiers.

By converting data to text-based representations of the data, the online system can normalize the data that is used to identify related items. The online system can thereby use the large language model to identify the related items. Thus, the online system improves on the technical fields of machine-learning models and data analysis by reducing the need to account for different data structures or formats that may change over time.

DETAILED DESCRIPTION

Figure 1A:
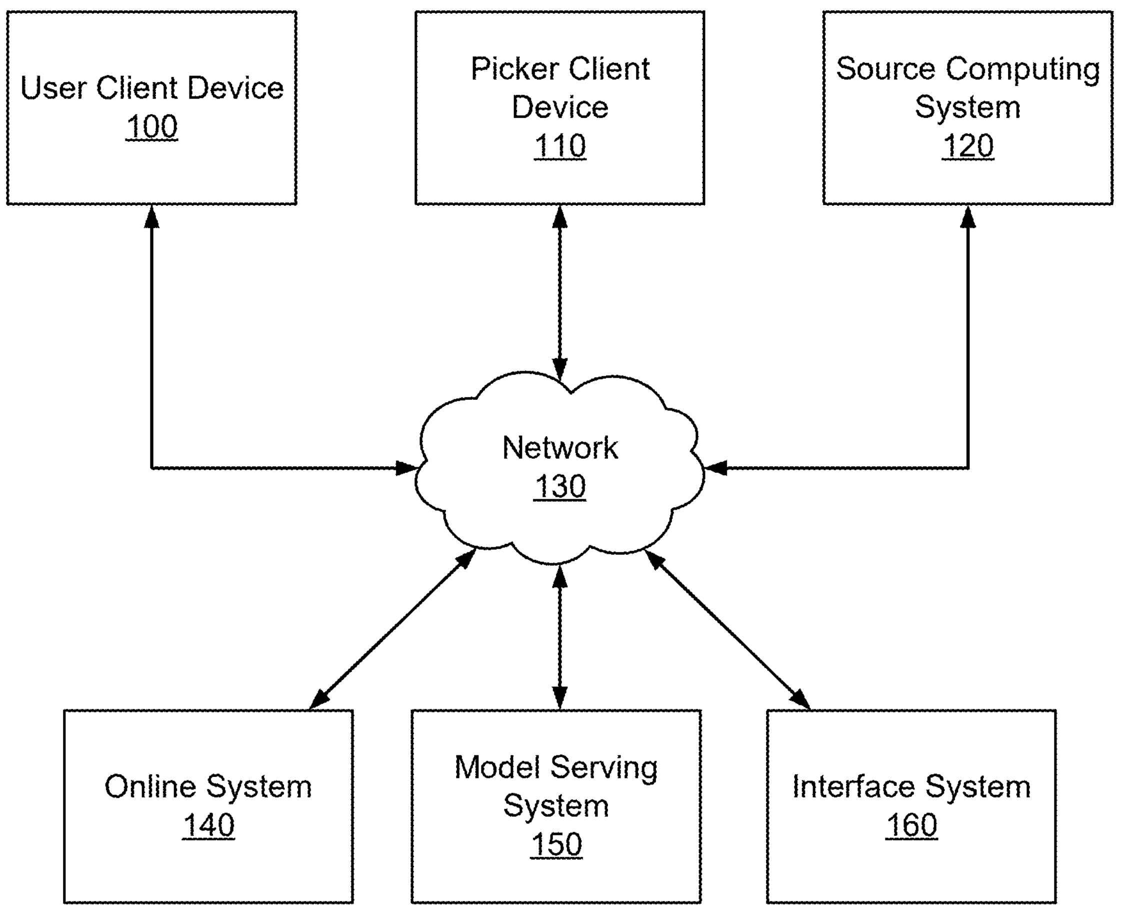
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one embodiment, the machine-learned models deployed by the model serving system 150 are models configured to perform one or more NLP tasks. The NLP tasks include, but are not limited to, text generation, query processing, machine translation, chatbots, and the like. In one embodiment, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one embodiment, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

In one embodiment, the online system 140 performs an inference task in conjunction with the model serving system 150 and/or the interface system 160 to continuously monitor item lists generated by users. An item list is a list of items or item identifiers for items that the user has collected or plans to collect. In some embodiments, an item list may be input by users before traveling to a source location. Alternatively, or in addition, an item list may be a running list of items while the user is located in the source location. For example, the running list of items may be generated based on items placed in a shopping cart, or a running list of items scanned by a user's mobile device. In some embodiments, the shopping cart may be a smart shopping cart configured to scan items placed therein. Alternatively, the source may include various sensors configured to detect whether an item is placed in a particular shopping cart. The online system 140 may be able to generate a remaining list based on the item list and the running list. The remaining list includes the items on the item list but have not been placed in the shopping cart.

In some embodiments, a user may provide a source location they intend to purchase the items from. Alternatively, the online system 140 may obtain a location of the user's client device 100 inside a source location, and determines the source location that the user is currently shopping at based on the obtained location. For example, a mobile application installed on the user's client device may be configured to obtain the location of the user's client device 100 via a global positioning system (GPS) and transmit the location to the online system 140.

Responsive to receiving the item list and the source at which a user is to shop for the list of items on the item list, the online system 140 accesses a map of the source, e.g., an interior map of the source describing various categories of items and their corresponding locations in the source. In some embodiments, the map may include textual data describing the categories of items and their locations. Alternatively, or in addition, the map may include 2D or 3D image data representing the physical structure of the source location. The online system 140 constructs a prompt based on the item list and the map. In one instance, the inputs to the prompt (in addition to any requests or instructions) includes the list of running items and remaining items for the user, the map of the source location, the location of the user in the source location, time of day or day of week, source catalog with item descriptions and locations of these items in the store, available discounts, coupons, and sales, and/or facts about user (e.g., historical baskets, frequency, type of device), and a request to the LLMs for recommendations for the user based on the list of items and their corresponding locations in the source location, or an order the user should obtain the items on the list in based on the locations of those relevant items in the source location.

For example, the list of items may include bananas, apples, bread, milk, eggs, tortillas, frozen burritos, spinach, celery, and sliced turkey. The map of the source location may describe that fruit and vegetables may be in aisle 1, cold-section (e.g., dairy, cheeses, plant-based milks, etc.) is in aisle 2, stacks (chips, cookies, crackers) are in aisle 3, frozen foods are in aisle 4, and beverages are in aisle 5. The request to the LLMs for recommendation may be "what order should I purchase my items in?", and/or "what other items would go well with these items?"

The online system 140 provides the prompt to a model serving system 150 for execution by the LLM, causing the LLMs to be executed on the prompt to generate a response. The model serving system 150 generates the response and passes the response to the online system 140. Responsive to receiving the response, the online system 140 parses the response to extract the recommendation to the user, and sends the recommendation to the client device 100 of the user, causing the client device 100 of the user to present the recommendation to the user.

For example, the recommendation may include: (1) banana, apple, and spinach are in aisle 1, (2) milk and eggs are in aisle 2, (3) bread, tortillas, and sliced turkey are in aisle 3, and (4) frozen burritos are in aisle 4. The recommendation may also suggest that the user pick their items based on this order. The recommendation may also include a list of additional items that would go well with the item list of the user. For example, the recommendation may state, "cheese: you can find cheese in the same aisle as the milk and eggs."

In this manner, the online system 140 provides recommendations tailored to a user's specific item list at a specific source location. By integrating the user's list with a map of the source location, the online system 140 offers items that are related to the user by offering items that the user may be inclined to collect.

Figure 1B:
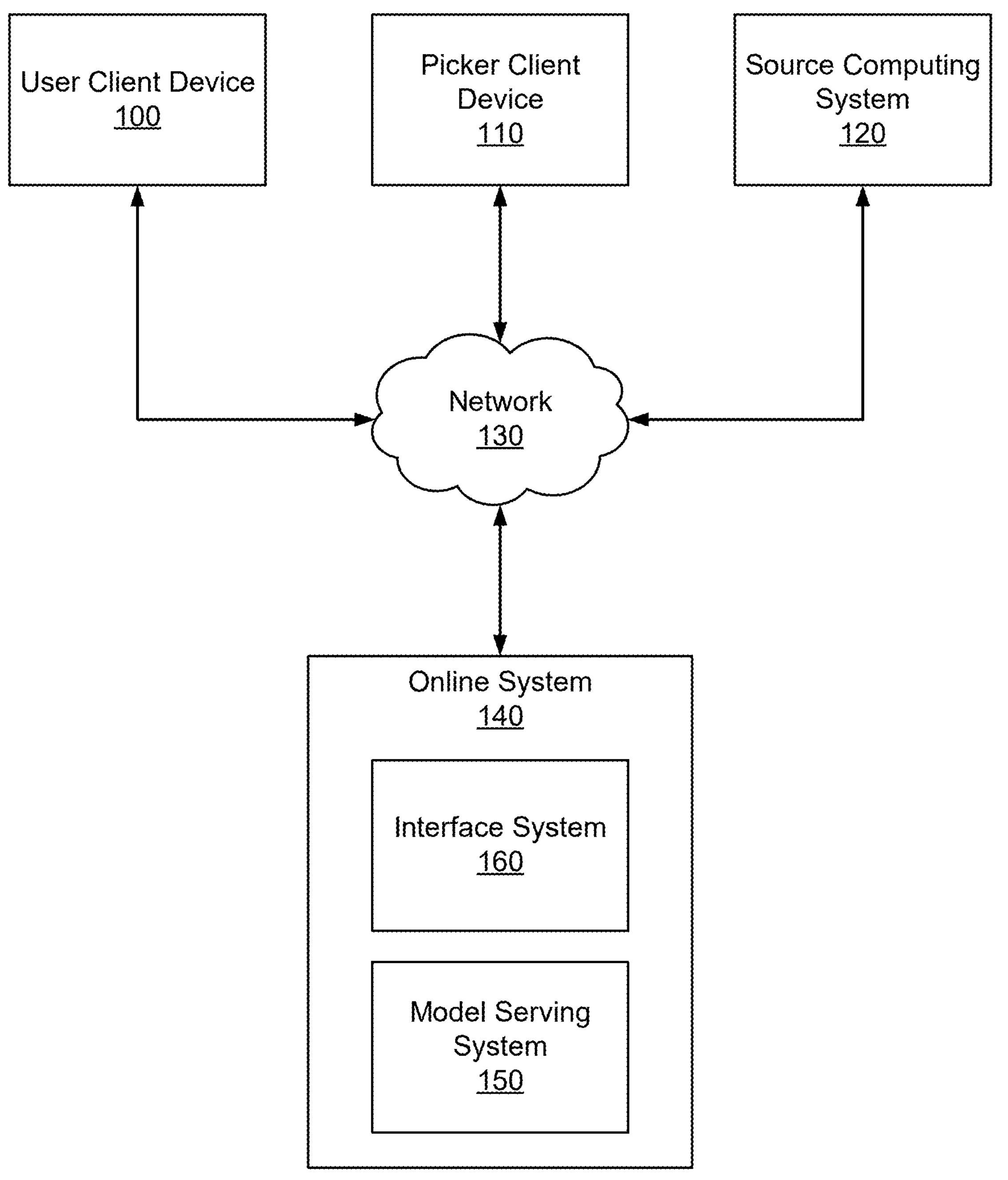
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 or the interface system 160 is managed by a separate entity from the online system 140. In one embodiment, as illustrated in the example system environment in FIG. 1B, the model serving system 150 or the interface system 160 is managed and deployed by the entity managing the online system 140.

Figure 2:
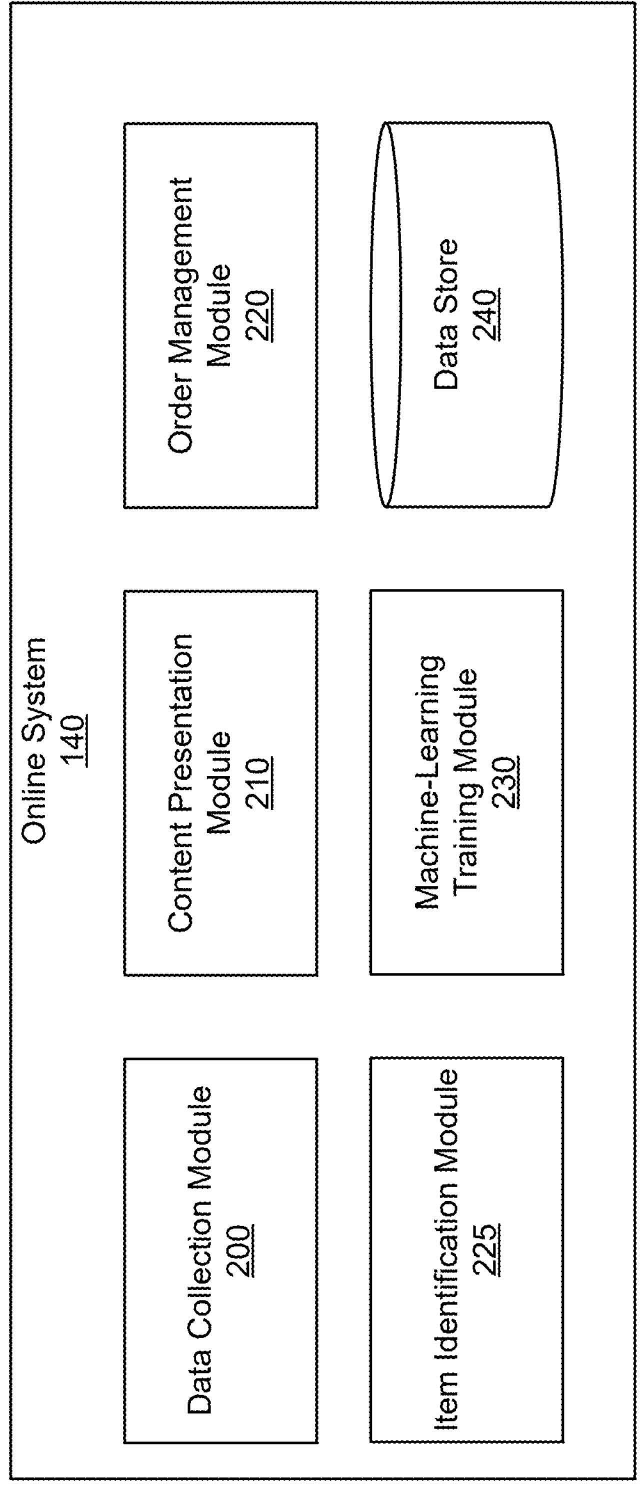
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, an item identification module 225, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The item identification module 225 is configured to receive and analyze item lists generated by users. In some embodiments, the item lists are received from user client devices 100 and stored in the data store 240. Each item list includes a list of item identifiers that identify items that are available at a source location. In some embodiments, the item list may be generated by a user directly or the item list may be a running list of items generated as a user puts items into their shopping cart at the source location. In some embodiments, a smart shopping cart may be configured to scan the item placed in itself and generate a running list of items for the user. In some embodiments, a store may include sensors configured to detect that an item is placed in a shopping cart. In some embodiments, the user can scan each item they put in the shopping cart by their client device 100, e.g., mobile phone.

In some embodiments, the data store 240 also stores maps of different stores. Each map includes information describing various categories of items and their corresponding locations. The map may be a coarse map, including various categories of items and their corresponding locations. For example, a coarse map of the source location may describe that fruit and vegetables may be in aisle 1, cold-section (e.g., dairy, cheeses, plant-based milks, etc.) is in aisle 2, stacks (chips, cookies, crackers) are in aisle 3, frozen foods are in aisle 4, and beverages are in aisle 5. Alternatively, or in addition, the map may include a detailed map, including every item and its corresponding location. In such a case, the map would specify a particular type of banana is in aisle 1, a particular brand of milk is in aisle 2, and so on and so forth. In some embodiments, the map may include textual data mapping different categories of items to different aisles or coordinates in the source location. In some embodiments, the map may include 2D or 3D image data representing the source location's structure and layout.

The item identification module 225 is configured to generate a prompt for input to the LLM. The prompt specifies at least the list of items, items already in the user's cart, the location of the user in the source location, the map of the source location, time of day or day of week, source location catalog with item descriptions and locations, available promotions for the source location, facts about user, and a request to infer a recommendation to the user based on the list of items and the map of the source location. In some embodiments, the LLMs are trained to process image data, e.g., a 2D or 3D map. In such cases, the prompt may include 2D or 3D image data. Alternatively, or in addition, the item identification module 225 includes an image processor configured to translate a 2D or 3D map into textual data describing relationships between categories of items and locations in the source location, and generate the prompt describing the map in textual format.

In some embodiments, the LLMs are trained to uniquely summarize multiple types of information, such as location of the user, location of the items, and contextual differences between similar but different items. For example, if the user has spaghetti, red sauce, Italian bread, and meatballs on their item list, the item identification module 225 may recommend adding parmesan cheese to the item list. In particular, the recommendation may state "You can get a parmesan block from the cheese aisle right after you pick up your bread. If you prefer cheese with a longer expiration date, you can get grated parmesan cheese next to your red sauce in aisle 7." In one or more embodiments, the cart includes and is configured with a display that allows an administrator (e.g., online system 140) to transmit instructions to present various types of information to aid the user's experience within a retailer store. In one or more embodiments, the item identification module 225 transmits instructions to a smart cart display that is used by a user within a retailer store, to present a map of the retailer store and/or a path for a user to take to fulfill the user's order as well as any recommendations for the user that the user should consider along this path. This way, the item identification module 225 can enhance the user's shopping experience by generating a user interface on a smart cart display that presents a geographical view and path of how the user can fulfill the list of items that the user intended to purchase, but also provide recommendations to the user that the user can consider depending on the user's present location or future locations within the store.

In some embodiments, the item identification module 225 may also consider other contextual information, such as time of the day, day of the week, a user's current location in store, historical item lists of the user, etc. In some embodiments, contextual information may be used to construct prompts. In some embodiments, the prompt can be tuned to emphasize more on product substitutions, attributes of items that result in substitutions, pricing and discounts, etc.

In some embodiments, the item identification module 225 maintains both an item list and a running list of items. The item list includes a first list of items that a user intends to collect. The running list of items includes a second list of items that the user has placed in their shopping cart in the source location. The item identification module 225 may use both the first list and the second list to construct a prompt. In some embodiments, the item identification module 225 may be configured to identify a remaining list of items based on the first list and the second list, and construct a prompt based on the remaining list of items for wayfinding and efficient paths. Below is an example prompt generated based on a remaining list of items:

Here is a list of items left in the user's item list: . . . For each item left in the user's item list, recommend where in the source location they can find each product. If the given product has multiple items that exist in more than one location, explain the differences between the items.

When you make recommendations, consider the locations of the other products left in their item list and recommend that they also grab these products up while they are in that location.

In some embodiments, the online system 140 may include a convolutional neural network (CNN) model trained for 3D image reconstruction. Users may take images of all the shelving, pass the images to the CNN model. The CNN model is trained to infer spatial location (e.g., the chips are 4 meters apart from the sodas, etc.) and then use that information to power a more cost-effective version of wayfinding. In some embodiments, the item identification module 225 may be able to construct a 2D or 3D representation of the source location based on the spatial data inferred from the CNN model, and present the 2D or 3D representation of the source location to users, illustrating the source location's layout and highlighting a route across various points on the map that guides the user to collect their list of items.

In some embodiments, the item identification module 225 is configured to generate a prompt based on the inferred spatial location from the CNN model, and pass the prompt to the LLMs to provide a more detailed plain language directions.

In some embodiments, the recommendations generated by the LLMs are further processed by the item identification module 225 to further consider other parameters, such as price, or what is on sale in the source location at the moment. The item identification module 225 may be configured to modify the recommendations generated by the LLMs based on these additional parameters, and send the modified recommendations to the client device of the user.

In some embodiments, the item identification module 225 also allows users to give feedback on whether these recommendations are useful. In some embodiments, an A/B test may be conducted to determine if different recommendations would increase a net promoter score (NPS), and/or increase a likelihood of retention. The NPS is a metric used to measure user satisfaction. In some embodiments, the NPS is used to gauge the likelihood of users to recommend a company, a product, or service to others. In some embodiments, the NPS is determined based on response to one or more questions, e.g., on a scale of 0-10, how likely are you to recommend our service to a friend or colleague?"

After that, the item identification module 225 may be configured to modify recommendations generated by the LLMs based on the result of the A/B test. Alternatively, or in addition, the LLMs may be further trained based on the results of the A/B test to provide better recommendations. Alternatively, or in addition, an additional model may be trained to further filter or modify the recommendations generated by the LLMs based on the results of the A/B test.

The machine-learning training module 230 trains machine-learning models used by the online system 140. For example, the machine learning module 230 may train the item selection model, the availability model, or any of the machine-learned models deployed by the model serving system 150. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 3:
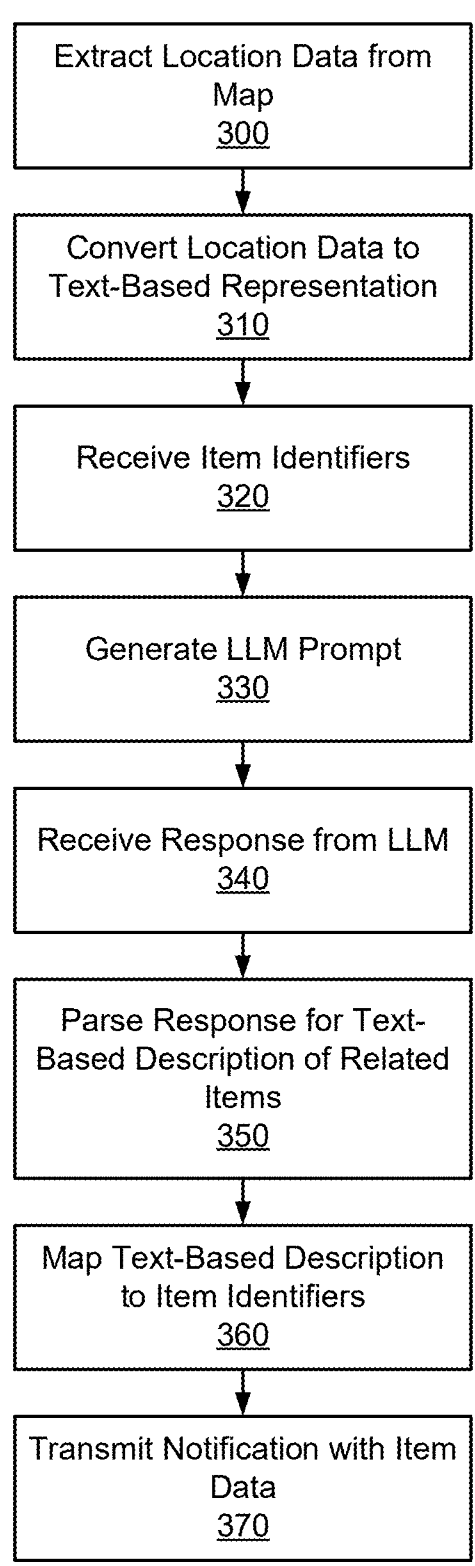
FIG. 3 is a flowchart illustrating an example method for identifying related items using text-based representations of data and a large-language model, in accordance with some embodiments.

FIG. 3 is a flowchart illustrating an example method for identifying related items using text-based representations of data and a large-language model, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system extracts 300 location data from a map of a source location and converts 310 the location data into a text-based representation of the location data. The online system receives 320 a set of item identifiers from a client device of a user and generates 330 an LLM prompt based on the set of item identifiers and the text-based representations of the location data. In some embodiments, the online system also generates the LLM prompt based on text-based representations of user data, context data (e.g., device location data), or source data. The online system receives 340 a response from the LLM and parses 350 the response for a text-based description of related items. The online system maps 360 the text-based description of the related items to item identifiers and transmits 370 a notification to the client device that includes item data associated with the related items. For example, the notification may include recommendations for items or an order in which a user should collect items, as described above.

Figure 4:
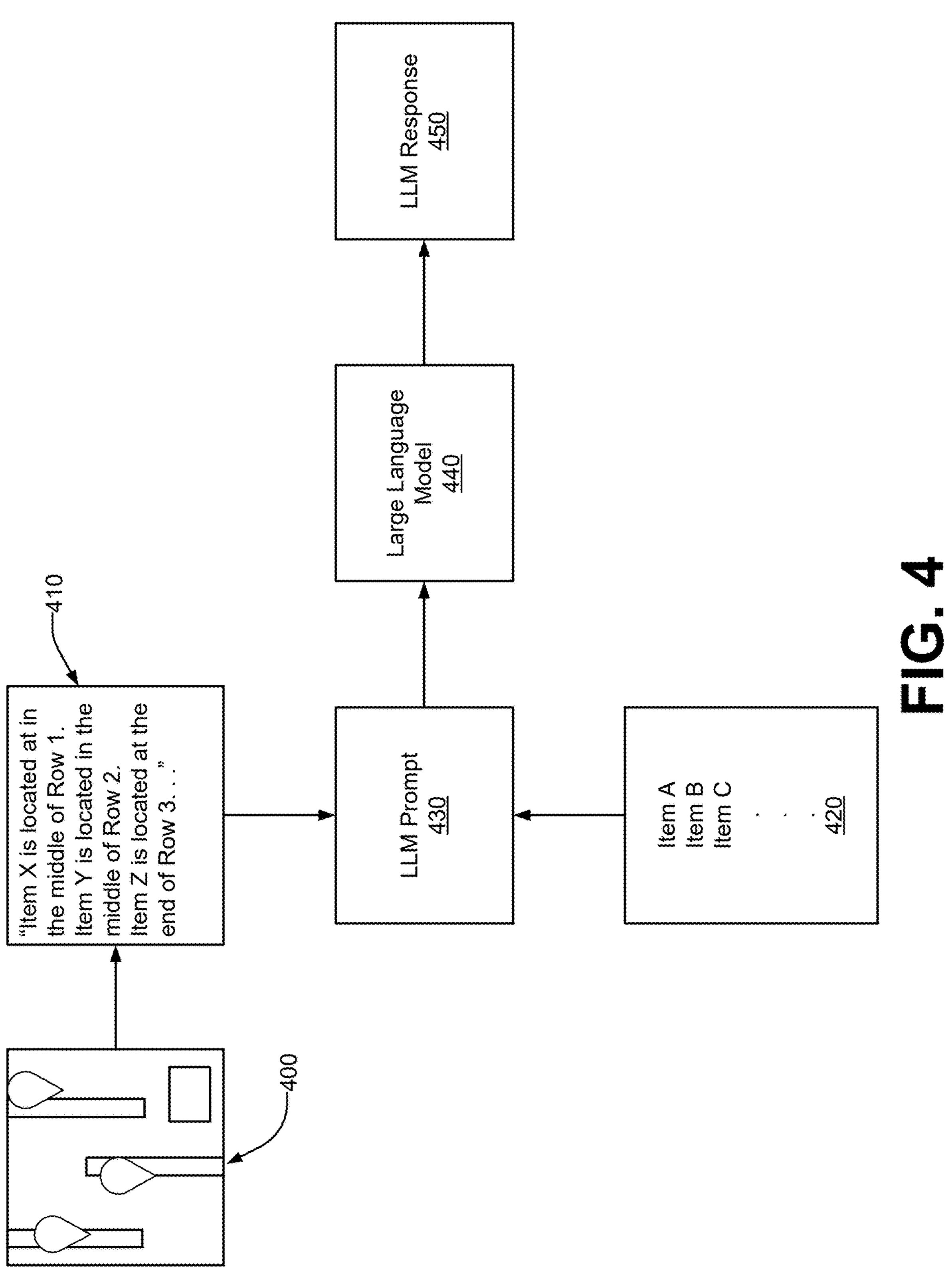
FIG. 4 illustrates an example data flow for an online system identifying items based on text-based representations of location data, in accordance with some embodiments.

FIG. 4 illustrates an example data flow for an online system identifying items based on text-based representations of location data, in accordance with some embodiments. The online system accesses a map 400 of a source location and generates a text-based representation 410 of the location data in the map. The online system generates an LLM prompt 430 based on the text-based representation 410 of the map 400 and a received set of items 420 from a client device. The online system inputs the LLM prompt 430 to the large language model 440 to generate a response 450, as described above. Based on the response 450, the online system may transmit instructions to display a map of the source location to, for example, a display configured on a smart shopping cart. The instructions may also include instructions to overlay a path on the map that indicates a path the user can take to fulfill the list of items for purchase. Moreover, the instructions may also include instructions to identify one or more recommended items for the user based on the context of the user (e.g., geographical location within the source location), and present the recommendations to the user on the display as well as location of purchase of these recommended items on the map of the source location.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method comprising:

extracting location data from a map of a source location, wherein the location data describes locations of a plurality of items within the source location;

converting the location data into a text-based representation of the location data, wherein the text-based representation comprises text describing the location data;

receiving a set of item identifiers from a client device associated with a user, wherein each of the item identifiers corresponds to an item of the plurality of items;

generating a prompt for input to a large language model, wherein the prompt comprises item data describing items corresponding to the set of item identifiers, the text-based representation of the location data, and instructions to identify a set of related items of the plurality of items based on the item data and the text-based representation of the location data;

receiving a response from the large language model;

parsing the response to extract a text-based description of the set of related items;

mapping the text-based description of the set of related items to an identifier for each of the set of related items; and transmitting a notification to the client device for display to the user based on the identifiers for the set of related items, wherein the notification comprises item data associated with each of the set of related items and locations of the set of related items within the source location.

2. The method of claim 1, further comprising:

receiving device location data captured by a sensor coupled to the client device, wherein the device location data describes a location of the client device;

generating a text-based representation of the device location data; and generating the prompt for input to the large language model based on the text-based representation of the device location data.

3. The method of claim 2, further comprising:

identifying the source location for items corresponding to the set item identifies based on the received device location data.

4. The method of claim 1, wherein converting the location data into a text-based representation of the location data comprises:

applying a template or rules-based logic to the location data.

5. The method of claim 1, wherein generating the prompt comprises:

accessing an item database storing item data for the plurality of items to retrieve the item data; and generating the prompt based on the retrieved item data.

6. The method of claim 1, wherein the prompt comprises instructions for the large language model to generate a route for the user to collect items corresponding to the set of item identifiers, and wherein the notification comprises the route for the user to collect items corresponding to the set of item identifiers.

7. The method of claim 1, wherein the map indicates locations of categories of items within the source location.

8. The method of claim 1, wherein the map indicates a location for each item of the plurality of items.

9. The method of claim 1, wherein the prompt for input to the large language model comprises instructions to generate the text-based description of the set of related items according to a specific format and wherein the response is parsed based on the specific format.

10. The method of claim 1, wherein the text-based description of the set of related items comprises a description of a generic item for each of the set of related items.

11. A non-transitory computer-readable medium storing instructions that, when executed, cause a processor to perform operations comprising:

extracting location data from a map of a source location, wherein the location data describes locations of a plurality of items within the source location;

converting the location data into a text-based representation of the location data, wherein the text-based representation comprises text describing the location data;

receiving a set of item identifiers from a client device associated with a user, wherein each of the item identifiers corresponds to an item of the plurality of items;

generating a prompt for input to a large language model, wherein the prompt comprises item data describing items corresponding to the set of item identifiers, the text-based representation of the location data, and instructions to identify a set of related items of the plurality of items based on the item data and the text-based representation of the location data;

receiving a response from the large language model;

parsing the response to extract a text-based description of the set of related items;

mapping the text-based description of the set of related items to an identifier for each of the set of related items; and transmitting a notification to the client device for display to the user based on the identifiers for the set of related items, wherein the notification comprises item data associated with each of the set of related items and locations of the set of related items within the source location.

12. The non-transitory computer-readable medium of claim 11, the operations further comprising:

receiving device location data captured by a sensor coupled to the client device, wherein the device location data describes a location of the client device;

generating a text-based representation of the device location data; and generating the prompt for input to the large language model based on the text-based representation of the device location data.

13. The non-transitory computer-readable medium of claim 12, the operations further comprising:

identifying the source location for the set of items based on the received device location data.

14. The non-transitory computer-readable medium of claim 11, wherein converting the location data into a text-based representation of the location data comprises:

applying a template or rules-based logic to the location data.

15. The non-transitory computer-readable medium of claim 11, wherein generating the prompt comprises:

accessing an item database storing item data for the plurality of items to retrieve the item data; and generating the prompt based on the retrieved item data.

16. The non-transitory computer-readable medium of claim 11, wherein the prompt comprises instructions for the large language model to generate a route for the user to collect items corresponding to the set of item identifiers, and wherein the notification comprises the route for the user to collect items corresponding to the set of item identifiers.

17. The non-transitory computer-readable medium of claim 11, wherein the map indicates locations of categories of items within the source location.

18. The non-transitory computer-readable medium of claim 11, wherein the map indicates a location for each item of the plurality of items.

19. The non-transitory computer-readable medium of claim 11, wherein the prompt for input to the large language model comprises instructions to generate the text-based description of the set of related items according to a specific format and wherein the response is parsed based on the specific format.

20. A system comprising:

a processor; and a non-transitory computer-readable medium storing instructions that, when executed, cause a processor to perform operations comprising:

extracting location data from a map of a source location, wherein the location data describes locations of a plurality of items within the source location;

converting the location data into a text-based representation of the location data, wherein the text-based representation comprises text describing the location data;

receiving a set of item identifiers from a client device associated with a user, wherein each of the item identifiers corresponds to an item of the plurality of items;

generating a prompt for input to a large language model, wherein the prompt comprises item data describing items corresponding to the set of item identifiers, the text-based representation of the location data, and instructions to identify a set of related items of the plurality of items based on the item data and the text-based representation of the location data;

receiving a response from the large language model;

parsing the response to extract a text-based description of the set of related items;

mapping the text-based description of the set of related items to an identifier for each of the set of related items; and transmitting a notification to the client device for display to the user based on the identifiers for the set of related items, wherein the notification comprises item data associated with each of the set of related items and locations of the set of related items within the source location.

* * * * *